(12) United States Patent
Trainer et al.

(10) Patent No.: US 10,199,954 B2
(45) Date of Patent: Feb. 5, 2019

(54) VOLTAGE SOURCE CONVERTER

(71) Applicant: GENERAL ELECTRIC TECHNOLOGY GmbH, Baden (CH)

(72) Inventors: David Reginald Trainer, Alvaston (GB); Omar Fadhel Jasim, Wollaton (GB); Dumisani Simfukwe, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/026,949

(22) PCT Filed: Aug. 1, 2014

(86) PCT No.: PCT/EP2014/066663
§ 371 (c)(1),
(2) Date: Apr. 1, 2016

(87) PCT Pub. No.: WO2015/049072
PCT Pub. Date: Apr. 9, 2015

(65) Prior Publication Data
US 2016/0248341 A1     Aug. 25, 2016

(30) Foreign Application Priority Data
Oct. 2, 2013    (GB) .................................. 1317433.9

(51) Int. Cl.
*H02M 7/217*     (2006.01)
*H02M 7/483*     (2007.01)
(Continued)

(52) U.S. Cl.
CPC ............. *H02M 7/217* (2013.01); *H02M 1/08* (2013.01); *H02M 7/483* (2013.01); *H02J 3/36* (2013.01);
(Continued)

(58) Field of Classification Search
CPC ........ H02M 1/08; H02M 1/081; H02M 1/088; H02M 7/483; H02M 2007/4835; H02J 3/36; H02J 2003/365; Y02E 60/60
See application file for complete search history.

(56) References Cited

U.S. PATENT DOCUMENTS

| 4,367,522 A | 1/1983 | Forstbauer et al. |
| 2006/0152085 A1* | 7/2006 | Flett .......................... B60L 9/30 307/75 |

(Continued)

FOREIGN PATENT DOCUMENTS

| CN | 103250318 A | 8/2013 |
| EP | 2 560 065 A1 | 2/2013 |

(Continued)

OTHER PUBLICATIONS

First Office Action and Search issued in connection with corresponding CN Application No. 201480065881.3 dated Nov. 30, 2017.

(Continued)

*Primary Examiner* — Jeffrey Gblende
*Assistant Examiner* — David A. Singh
(74) *Attorney, Agent, or Firm* — GE Global Patent Operation; Scott R. Stanley

(57) ABSTRACT

A voltage source converter includes DC terminals, a plurality of single-phase limbs, and a controller. Each single-phase limb includes a phase element and switching elements. Each limb is connected between the DC terminals and is controllable to generate an AC voltage at the AC side of the corresponding phase element so as to draw a respective phase current from a multi-phase AC electrical network. The controller is configured to selectively generate a modified AC voltage demand for at least one limb in response to an imbalance in the phase currents and/or a change in electrical rating of at least one limb. The controller is configured to (Continued)

selectively control, in accordance with the or the respective modified AC voltage demand, the or each corresponding limb independently of the or each other limb to modify the voltage at the AC side of its phase element and thereby modify the corresponding phase current.

17 Claims, 11 Drawing Sheets

(51) Int. Cl.
  *H02M 1/08* (2006.01)
  *H02J 3/36* (2006.01)
(52) U.S. Cl.
  CPC ...... *H02M 2007/4835* (2013.01); *Y02E 60/60* (2013.01)

(56) References Cited

U.S. PATENT DOCUMENTS

| | | | | |
|---|---|---|---|---|
| 2012/0188803 | A1* | 7/2012 | Trainer | H02M 1/4233 363/37 |
| 2012/0314466 | A1 | 12/2012 | Goerges et al. | |
| 2013/0094264 | A1* | 4/2013 | Crookes | H02J 3/1835 363/127 |
| 2013/0208514 | A1* | 8/2013 | Trainer | H02J 3/36 363/35 |
| 2013/0208521 | A1* | 8/2013 | Trainer | H02J 3/36 363/126 |
| 2014/0015555 | A1* | 1/2014 | Fox | G01R 31/40 324/750.01 |
| 2014/0362618 | A1* | 12/2014 | Hassan | H02J 3/1857 363/35 |
| 2015/0049530 | A1* | 2/2015 | Trainer | H02M 7/797 363/123 |
| 2015/0295507 | A1* | 10/2015 | Barupati | H02M 7/487 363/35 |
| 2015/0357905 | A1* | 12/2015 | Nami | H02M 1/32 363/53 |

FOREIGN PATENT DOCUMENTS

| | | |
|---|---|---|
| EP | 2 560 275 | 2/2013 |
| WO | WO-2010/088969 A1 | 8/2010 |
| WO | WO-2010/145708 | 12/2010 |
| WO | WO-2011/127980 A1 | 10/2011 |
| WO | WO-2013/140168 | 9/2013 |

OTHER PUBLICATIONS

Amanhwah, E.K., et al., "Cell capacitor voltage control in a parallel hybrid modular multilevel voltage source converter for HVDC applications," Power Electronics, Machines and Drives, (PEMD 2012), 6th IET International Conference, pp. 1-6 (Mar. 27-29, 2012).
Feldman, R., et al., "A hybrid voltage source converter arrangement for HVDC power transmission and reactive power compensation," 5th IET International Conference on Power Electronics, Machines and Drives (PEMD 2010), pp. 1-6 (2010).
Feldman, R., et al., "A low loss modular multilevel voltage source converter for HVDC power transmission and reactive power compensation," 9th IET International Conference on AC and DC Power Transmission, pp. 1-5 (2010).
Rice, M., "Digital Communications: A Discrete-time Approach," Prentice Hall Higher Educations, pp. 238-260 (2009).
Teodorescu, R., et al., "Grid Converters for Photovoltaic and Wind Power Systems," Wiley-IEEE, pp. 58-63 (2011).
Tomasini, M., et al., "DC-link voltage ripple minimization in a modular multilevel voltage source converter for HVDC power transmission," 2011-14th European Conference on Power Electronics and Applications (2010).
Trainer, D.R., et al., "A new hybrid voltage source converter for HVDC power transmission," CIGRE 2010 (B4-111), pp. 1-12 (2010).
Examination Report under Section 18(3) for GB Application No. GB1317433.9, dated Oct. 8, 2015, 3 pages.
Feldman, et al., A Hybrid Voltage Source Converter Arrangement for HVDC Power Transmission and Reactive Power Compensation, 5th IET International Conference on Power Electronics, Machines and Drives 2010 (PEMD 2010), Apr. 19-21, 2010, 6 pages.
International Search Report and Written Opinion for PCT Application No. PCT/EP2014/066663, dated Oct. 30, 2014, 8 pages.
Search Report under Section 17 for GB Application No. GB1317433. 9, dated Feb. 28, 2014, 4 pages.

\* cited by examiner

VOLTAGE SOURCE CONVERTER

CROSS-REFERENCE TO RELATED APPLICATIONS

This present application is a 371 U.S. National Application of International Application No. PCT/EP2014/066663, entitled "VOLTAGE SOURCE CONVERTER," filed Aug. 1, 2014, which claims the benefit of and priority to United Kingdom Application No. 1317433, entitled "VOLTAGE SOURCE CONVERTER," filed Oct. 2, 2013, which is incorporated herein by reference in its entirety.

This invention relates to a voltage source converter.

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC electrical networks operating at different frequencies. In any such power transmission network, converters are required at each interface between AC and DC power to effect the required conversion, and one such form of converter is a voltage source converter (VSC).

According to an aspect of the invention, there is provided a voltage source converter comprising:
  first and second DC terminals for connection to a DC electrical network;
  a plurality of single-phase limbs, each single-phase limb including a phase element, each phase element including a plurality of switching elements configured to interconnect a DC voltage and an AC voltage, an AC side of each phase element being connectable to a respective phase of a multi-phase AC electrical network, each single-phase limb being connected between the first and second DC terminals, each single-phase limb being controllable to generate an AC voltage at the AC side of the corresponding phase element so as to draw a respective phase current from the multi-phase AC electrical network; and
  a controller configured to selectively generate a or a respective modified AC voltage demand for at least one single-phase limb in response to an imbalance in the plurality of phase currents and/or a change in electrical rating of at least one single-phase limb,
  wherein the controller is configured to selectively control, in accordance with the or the respective modified AC voltage demand, the or each corresponding single-phase limb independently of the or each other single-phase limb to modify the AC voltage at the AC side of its phase element and thereby modify the corresponding phase current.

The configuration of the voltage source converter according to the invention allows the control of at least one single-phase limb to draw a phase current from the multi-phase AC electrical network to be carried out independently of the control of each other single-phase limb to draw a phase current from the multi-phase AC electrical network, and thereby enables modification of at least one phase current drawn from the multi-phase AC electrical network without affecting the other phase currents. This provides the voltage source converter with the capability to readily draw a wide range of combinations of phase currents from the multi-phase AC electrical network.

In use, at least one phase current drawn by the voltage source converter from the multi-phase AC electrical network may vary outside a or a respective normal operating range. An example of at least one phase current drawn by the voltage source converter from the multi-phase AC electrical network varying outside a or a respective normal operating range is when the phase currents are unbalanced due to various factors such as uneven loading of the phases, uneven transmission line or transformer phase impedance, or manufacturing differences between the single-phase limbs. The aforementioned capability of the voltage source converter may be used to control at least one phase current within a or a respective desired operating range in response to an imbalance in the plurality of phase currents. For example, the controller may be configured to selectively control, in accordance with the or the respective modified AC voltage demand, the or each corresponding single-phase limb independently of the or each other single-phase limb to modify the AC voltage at the AC side of its phase element and thereby modify the corresponding phase current so as to balance the plurality of phase currents.

The aforementioned capability of the voltage source converter may also be used to modify at least one phase current to compensate for any change in electrical rating (e.g. power/current/voltage/energy storage rating) of at least one single-phase limb. For example, component failure in at least one single-phase limb may lead to a reduction in voltage and/or current rating, thus requiring modification of the or each corresponding phase current to allow the single-phase limb to operate within the reduced voltage and/or current rating.

In contrast, omission of the controller from the voltage source converter would make it difficult to modify one of the phase currents individually without affecting the other remaining phase currents in response to an imbalance in the plurality of phase currents and/or a change in electrical rating of at least one single-phase limb, thus limiting the range of combinations of phase currents that can be readily drawn by the voltage source converter from the multi-phase AC electrical network.

In addition the inclusion of the controller in the voltage source converter obviates the need for additional converter hardware to provide the voltage source converter with a similar capability to readily draw a wide range of combinations of phase currents from the multi-phase AC electrical network in response to an imbalance in the plurality of phase currents and/or a change in electrical rating of at least one single-phase limb, thus minimising the size, weight and cost of the voltage source converter.

It will be appreciated that the configuration of the voltage source converter in this manner permits operation of the controller to enable modification of only one of the plurality of phase currents, or simultaneous modification of two to all of the plurality of phase currents.

It will be appreciated that the configuration of the controller may vary so as long as the controller is capable of selectively generating a or a respective modified AC voltage demand for at least one single-phase limb in response to an imbalance in the plurality of phase currents and/or a change in electrical rating of at least one single-phase limb, and the controller is capable of selectively controlling, in accordance with the or the respective modified AC voltage demand, the or each corresponding single-phase limb independently of the or each other single-phase limb to modify the AC voltage at the AC side of its phase element and thereby modify the corresponding phase current.

The controller may be configured to selectively process an or a respective actual phase voltage or phase current of at least one phase of the multi-phase AC electrical network so as to derive a or a respective simulated multi-phase AC power source for the or each corresponding single-phase limb, the or each simulated multi-phase AC power source being defined by a plurality of balanced voltage or current phasors that consists of an actual voltage or current phasor and a plurality of virtual voltage or current phasors. The controller may be further configured to selectively process the or each corresponding phase current and the or each plurality of balanced voltage or current phasors so as to generate a or a respective modified AC voltage demand for the or each corresponding single-phase limb in response to an imbalance in the plurality of phase currents and/or a change in electrical rating of at least one single-phase limb.

The controller may be further configured to selectively process the or each plurality of balanced voltage phasors to derive voltage magnitude and frequency terms. The controller may be configured to combine the voltage magnitude and frequency terms with real and reactive power demands so as to derive a or a respective reference current demand. The controller may be configured to process the or each reference current demand and the or each corresponding phase current so as to generate a or a respective modified AC voltage demand for the or each corresponding single-phase limb in response to an imbalance in the plurality of phase currents and/or a change in electrical rating of at least one single-phase limb.

The controller may include at least one quadrature signal generator block configured to selectively process an or a respective actual phase voltage of at least one phase of the multi-phase AC electrical network so as to derive a or a respective simulated multi-phase AC power source for the or each corresponding single-phase limb, the or each simulated multi-phase AC power source being defined by a plurality of balanced voltage phasors that consists of an actual voltage phasor and a plurality of virtual voltage phasors. The or each quadrature signal generator block may be further configured to selectively process the or each plurality of balanced voltage phasors to derive the voltage magnitude and frequency terms.

The controller may be configured to selectively process an or a respective actual phase voltage or phase current of at least one phase of the multi-phase AC electrical network so as to derive a or a respective simulated multi-phase AC power source for the or each corresponding single-phase limb, the or each simulated multi-phase AC power source being defined by a plurality of balanced voltage or current phasors that consists of an actual voltage or current phasor and a plurality of virtual voltage or current phasors. The controller may be further configured to selectively process the or each corresponding phase current so as to derive a or a respective current vector that corresponds to the or the respective simulated multi-phase AC power source. The controller may be further configured to selectively process the or each current vector so as to generate a or a respective modified AC voltage demand for the or each corresponding single-phase limb in response to an imbalance in the plurality of phase currents and/or a change in electrical rating of at least one single-phase limb.

For the purposes of this specification, the term "actual" is intended to describe a physically existing value, while the term "virtual" is intended to describe a value that does not physically exist but is instead created using the controller.

The controller may include at least one quadrature signal generator block configured to selectively process an or a respective actual phase voltage or phase current of at least one phase of the multi-phase AC electrical network so as to derive a or a respective simulated multi-phase AC power source for the or each corresponding single-phase limb, the or each simulated multi-phase AC power source being defined by a plurality of balanced voltage phasors that consists of an actual voltage or current phasor and a plurality of virtual voltage or current phasors. The or each quadrature signal generator block may be further configured to selectively process the or each corresponding phase current so as to derive a or a respective current vector that corresponds to the or the respective simulated multi-phase AC power source. The controller may further include at least one vector control block configured to selectively process the or each current vector so as to generate a or a respective modified AC voltage demand for the or each corresponding single-phase limb in response to an imbalance in the plurality of phase currents and/or a change in electrical rating of at least one single-phase limb.

The or each vector control block may include a proportional-integral control block. The inclusion of the proportional-integral control block in the or each vector control block enables the or each vector control block to process the or each current vector in the synchronously rotating d-q reference frame so as to generate the or the respective modified AC voltage demand for the or each corresponding single-phase limb in response to an imbalance in the plurality of phase currents and/or a change in electrical rating of at least one single-phase limb.

The or each vector control block may include a proportional-resonant control block. The inclusion of the proportional-resonant control block in the or each vector control block enables the or each vector control block to process the or each current vector in the stationary α-β reference frame so as to generate the or the respective modified AC voltage demand for the or each corresponding single-phase limb in response to an imbalance in the plurality of phase currents and/or a change in electrical rating of at least one single-phase limb.

The or each current vector may be in a synchronously rotating d-q reference frame or stationary α-β reference frame. This enables the or each current vector to be subsequently processed by the vector control block so as to generate the or the modified respective AC voltage demand for the or each corresponding single-phase limb in response to an imbalance in the plurality of phase currents and/or a change in electrical rating of at least one single-phase limb.

The or each quadrature signal generator block may be configured to selectively process an or a respective actual phase voltage or phase current of at least one phase of the multi-phase AC electrical network to generate a respective output signal, the or each output signal being orthogonal to the corresponding actual phase voltage or phase current, so as to derive the or the respective simulated multi-phase AC power source for the or each corresponding single-phase limb.

In other embodiments of the invention, the controller may be configured to selectively process an or a respective actual phase voltage of at least one phase of the multi-phase AC electrical network so as to derive voltage magnitude and frequency terms. The controller may be configured to combine the voltage magnitude and frequency terms with real and reactive power demands so as to derive a or a respective reference current demand. The controller may be configured to process the or each reference current demand and the or each corresponding phase current so as to generate a or a respective modified AC voltage demand for the or each corresponding single-phase limb in response to an imbalance in the plurality of phase currents and/or a change in electrical rating of at least one single-phase limb.

In such embodiments, the controller may include at least one single-phase phase locked loop configured to selectively process an or a respective actual phase voltage of at least one phase of the multi-phase AC electrical network so as to derive the voltage magnitude and frequency terms.

The configuration of the single-phase PLL may vary as long as it is capable of selectively processing an or a respective actual phase voltage of at least one phase of the multi-phase AC electrical network so as to derive the voltage magnitude and frequency terms.

In embodiments of the invention, the controller may further at least one control block configured to selectively process the or each reference current demand and the or each corresponding phase current so as to generate a or a respective modified AC voltage demand for the or each corresponding single-phase limb in response to an imbalance in the plurality of phase currents and/or a change in electrical rating of at least one single-phase limb, the or each control block including a proportional-resonant control block.

It will be appreciated that the single-phase limbs may be configured in different ways to vary the topology of the voltage source converter.

The configuration of the plurality of switching elements in each phase element may vary so long as the plurality of switching elements is capable of interconnecting a DC voltage and an AC voltage. For example, the plurality of switching elements in each phase element may include two parallel-connected pairs of series-connected switching elements, a junction between each pair of series-connected switching elements defining an AC terminal for connection to the respective phase of the multi-phase AC electrical network.

The manner in which each single-phase limb is connected between the first and second DC terminals may vary. For example, the plurality of single-phase limbs may be connected in series between the first and second DC terminals.

Each single-phase limb may include an auxiliary converter connected with the respective phase element. Each auxiliary converter may be configured to selectively act as a waveform synthesizer to modify a DC voltage at a DC side of the corresponding phase element.

The configuration of each auxiliary converter may vary as long as each auxiliary converter is capable of selectively acting as a waveform synthesizer to modify a DC voltage at the DC side of the corresponding phase element. For example, each auxiliary converter may be connected in parallel with the corresponding phase element to form the respective single-phase limb.

In embodiments of the invention, each auxiliary converter may be or may include a current source.

In further embodiments of the invention, each auxiliary converter may be or may include a multilevel converter, e.g. a flying capacitor converter or a diode clamped converter.

In still further embodiments of the invention, each auxiliary converter may include at least one module, the or each module including at least one switching element and at least one energy storage device, the or each switching element and the or each energy storage device in each module combining to selectively provide a voltage source.

The inclusion of the or each module in each auxiliary converter provides each auxiliary converter with a reliable means of modifying the DC voltage at the DC side of the corresponding phase element.

The configuration of the or each module in each auxiliary converter may vary. For example, the or each module in each auxiliary converter may include a pair of switching elements connected in parallel with an energy storage device in a half-bridge arrangement to define a 2-quadrant unipolar module that can provide zero or positive voltage and can conduct current in two directions.

Each auxiliary converter may include a plurality of series-connected modules that defines a chain-link converter. The structure of the chain-link converter permits build up of a combined voltage across the chain-link converter, which is higher than the voltage available from each of its individual modules, via the insertion of the energy storage devices of multiple modules, each providing its own voltage, into the chain-link converter. In this manner switching of the or each switching element in each module causes the chain-link converter to provide a stepped variable voltage source, which permits the generation of a voltage waveform across the chain-link converter using a step-wise approximation. As such each chain-link converter is capable of providing a wide range of complex voltage waveforms for modifying the DC voltage at the DC side of the corresponding phase element.

The controller may be configured to selectively control, in accordance with the or the respective modified AC voltage demand, the or each corresponding single-phase limb independently of the or each other single-phase limb to modify the AC voltage at the AC side of its phase element and thereby modify the corresponding phase current so as to carry out regulation of the energy level of the or each corresponding auxiliary converter.

Variation of at least one phase current drawn by the voltage source converter from the multi-phase AC electrical network outside a or a respective normal operating range, or component failure in one or more modules of at least one auxiliary converter leading to a reduction in energy storage capacity (i.e. energy storage rating), could result in energy accumulation in (or energy loss from) at least one energy storage device, thus resulting in deviation of the energy level of at least one energy storage device from a reference value.

Such a deviation is undesirable because, if too little energy is stored within a given energy storage device then the voltage the corresponding module is able to generate is reduced, whereas if too much energy is stored in a given energy storage device then over-voltage problems may arise. The former would require the addition of a power source to restore the energy level of the affected energy storage device to the reference value, while the latter would require an increase in voltage rating of one or more energy storage devices to prevent the over-voltage problems, thus adding to the overall size, weight and cost of the voltage source converter.

The configuration of the voltage source converter according to the invention allows at least one single-phase limb to readily draw a suitable phase current from the multi-phase AC electrical network to regulate the energy stored in one or more corresponding energy storage devices, thereby obviating the problems associated with a deviation of the energy level of at least one energy storage device from the reference value.

Regulation of the energy level of the or each corresponding auxiliary converter may involve balancing of the energy levels of the plurality of auxiliary converters. This is useful when there is an imbalance in the energy levels of the plurality of auxiliary converters, which could be caused by, for example, an imbalance of the plurality of phase currents drawn from the multi-phase AC electrical network, or component failure in one or more modules of at least one auxiliary converter leading to a reduction in energy storage capacity.

At least one switching element may include at least one self-commutated switching device. The or each self-commutated switching device may be an insulated gate bipolar transistor, a gate turn-off thyristor, a field effect transistor, an injection-enhanced gate transistor, an integrated gate commutated thyristor or any other self-commutated switching device. The number of switching devices in each switching element may vary depending on the required voltage and current ratings of that switching element.

The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each energy storage device may be any device that is capable of storing and releasing energy, e.g. a capacitor, fuel cell or battery.

Preferred embodiments of the invention will now be described, by way of non-limiting examples only, with reference to the accompanying drawings in which:

FIGS. 1 to 5 show, in schematic form, a voltage source converter according to a first embodiment of the invention;

FIGS. 6a to 6c respectively illustrate, in graph form, the variation in voltage level of a capacitor in a respective auxiliary converter of the voltage source converter of FIG. 1 when the plurality of phase currents drawn by the voltage source converter from a three-phase AC electrical network are unbalanced;

FIGS. 6d to 6f respectively illustrate, in graph form, the variation in voltage level of a capacitor in a respective auxiliary converter of the voltage source converter of FIG. 1 when the plurality of phase currents drawn by the voltage source converter from a three-phase AC electrical network are balanced using a controller;

Figure 1:
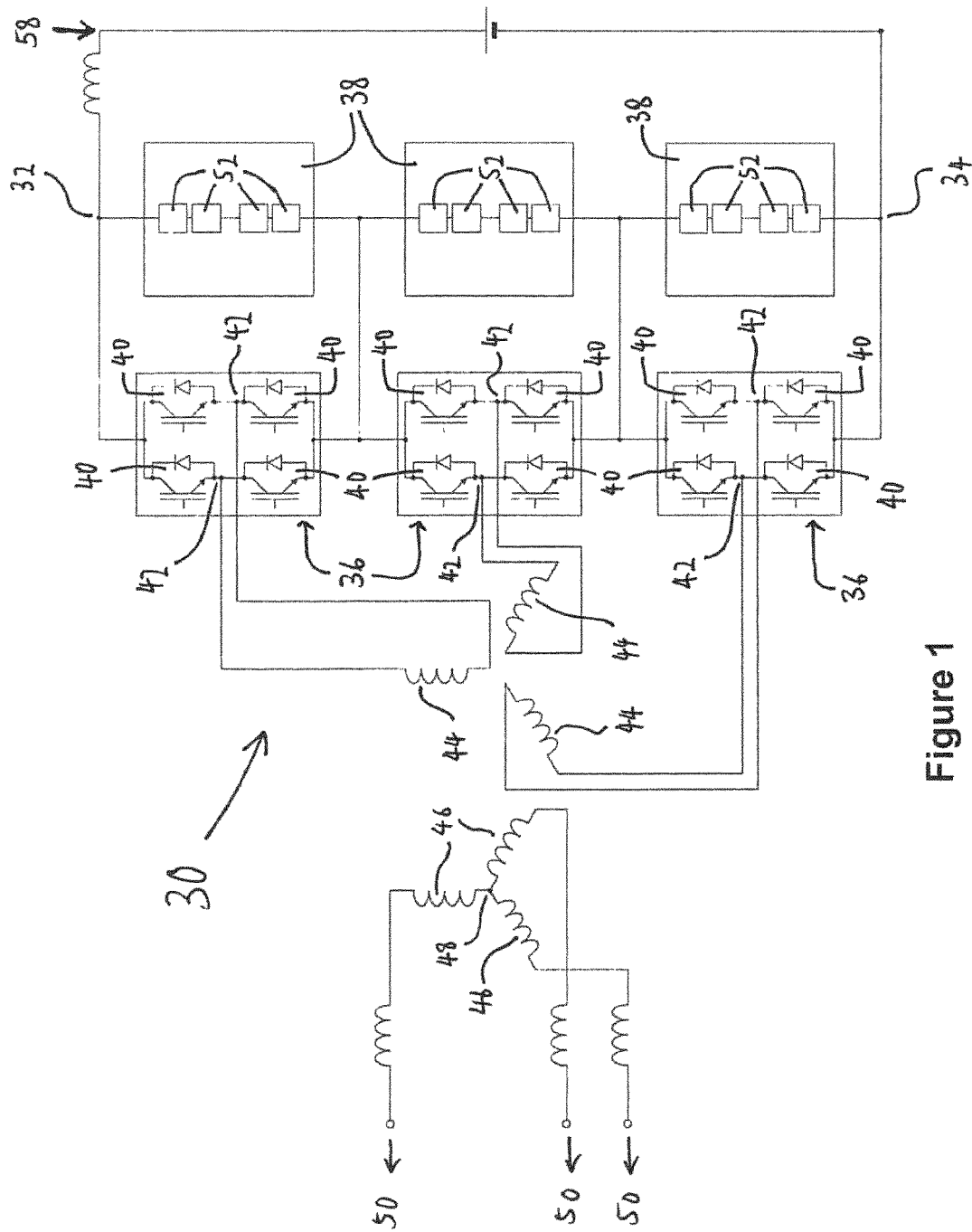

A first voltage source converter 30 according to a first embodiment of the invention is shown in FIGS. 1 to 5.

The first voltage source converter 30 comprises first and second DC terminals 32,34, a plurality of phase elements 36, and a plurality of auxiliary converters 38.

Each phase element 36 includes two parallel-connected pairs of series-connected switching elements 40. A junction between each pair of series-connected switching elements 40 defines an AC terminal. The AC terminals of each phase element 36 define the AC side 42 of that phase element 36.

In use, the AC terminals of each phase element 36 are interconnected by a respective one of a plurality of secondary transformer windings 44. Each secondary transformer winding 44 is mutually coupled with a respective one of a plurality of primary transformer windings 46. The plurality of primary transformer windings 46 are connected in a star configuration in which a first end of each primary transformer winding 46 is connected to a common junction 48 and a second end of each primary transformer winding 46 is connected to a respective phase of a three-phase AC electrical network 50. In this manner, in use, the AC side 42 of each phase element 36 is connected to a respective phase of a three-phase AC electrical network 50.

Each auxiliary converter 38 is connected in parallel with a respective one of the plurality of phase elements 36 to form a single-phase limb. More particularly, in each single-phase limb, the auxiliary converter 38 is connected in parallel with the two parallel-connected pairs of series-connected switching elements 40.

Figure 2:
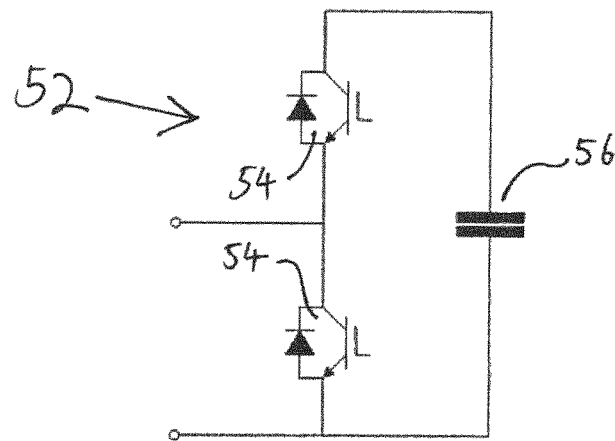

Each auxiliary converter 38 includes a plurality of modules 52. Each module 52 includes a pair of switching elements 54 and an energy storage device 56 in the form of a capacitor. The pair of switching elements 54 are connected in parallel with the capacitor 56 in a half-bridge arrangement, as shown in FIG. 2.

The plurality of single-phase limbs is connected in series between the first and second DC terminals 32,34. In use, the first and second DC terminals 32,34 are respectively connected to first and second terminals of a DC electrical network 58, the first terminal of the DC electrical network 58 carrying a positive DC voltage, the second terminal of the DC electrical network 58 carrying a negative DC voltage. This means that, in use, a DC voltage appears across the parallel-connected pairs of series-connected switching elements 40 of each phase element 36.

As such, in use, each phase element 36 interconnects a DC voltage and an AC voltage. In other embodiments, it is envisaged that each phase element may include a plurality of switching elements with a different configuration to interconnect a DC voltage and an AC voltage.

Each switching element 40,54 includes a single switching device. Each switching element 40,54 further includes a passive current check element that is connected in anti-parallel with each switching device.

Each switching device is in the form of an insulated gate bipolar transistor (IGBT). It is envisaged that, in other embodiments of the invention, each IGBT may be replaced by a gate turn-off thyristor, a field effect transistor, an injection-enhanced gate transistor, an integrated gate commutated thyristor or any other self-commutated switching device. The number of switching devices in each switching element may vary depending on the required voltage rating of that switching element.

Each passive current check element includes a passive current check device in the form of a diode. It is envisaged that, in other embodiments, each diode may be replaced by any other device that is capable of limiting current flow in only one direction. The number of passive current check devices in each passive current check element may vary depending on the required voltage rating of that passive current check element.

It is further envisaged that, in other embodiments of the invention, each capacitor may be replaced by another type of energy storage device that is capable of storing and releasing energy, e.g. a fuel cell or battery.

The plurality of series-connected modules 52 in each auxiliary converter 38 defines a chain-link converter.

The capacitor of each module 52 is selectively bypassed or inserted into the chain-link converter by changing the states of the switching elements 54. This selectively directs current through the capacitor or causes current to bypass the capacitor, so that the module 52 provides a zero or positive voltage.

The capacitor of the module 52 is bypassed when the switching elements 54 in the module 52 are configured to form a short circuit in the module 52. This causes current in the chain-link converter to pass through the short circuit and bypass the capacitor, and so the module 52 provides a zero voltage, i.e. the module 52 is configured in a bypassed mode.

The capacitor of the module 52 is inserted into the chain-link converter when the switching elements 54 in the module 52 are configured to allow the current in the chain-link converter to flow into and out of the capacitor. The capacitor then charges or discharges its stored energy so as to provide a non-zero voltage, i.e. the module 52 is configured in a non-bypassed mode.

In this manner the pair of switching elements 54 are connected in parallel with the capacitor in a half-bridge arrangement to define a 2-quadrant unipolar module 52 that can provide zero or positive voltage and can conduct current in two directions. It is envisaged that, in other embodiments of the invention, each module may be replaced by another type of module that includes at least one switching element and at least one energy storage device, the or each switching element and the or each energy storage device in the or each module combining to selectively provide a voltage source.

The structure of the chain-link converter permits build up of a combined voltage across the chain-link converter, which is higher than the voltage available from each of its individual modules 52, via the insertion of the energy storage devices 56 of multiple modules 52, each providing its own voltage, into the chain-link converter. In this manner switching of each switching element 54 in each module 52 causes the chain-link converter to provide a stepped variable voltage source, which permits the generation of a voltage waveform across the chain-link converter using a step-wise approximation. As such each chain-link converter is capable of providing a wide range of complex voltage waveforms for modifying the DC voltage at the DC side of the corresponding phase element 36.

The parallel connection of the auxiliary converter 38 and phase element 36 permits the auxiliary converter 38 to selectively act as a waveform synthesizer to modify a DC voltage at a DC side of the corresponding phase element 36. Such modification of the DC voltage at the DC side of the corresponding phase element 36 results in a corresponding modification of the AC voltage at the AC side 42 of the corresponding phase element 36.

It is envisaged that, in other embodiments of the invention, the configuration of each auxiliary converter may vary as long as each auxiliary converter is capable of selectively acting as a waveform synthesizer to modify a DC voltage at the DC side of the corresponding phase element. For example, the auxiliary converter may include a current source, or may be a multilevel converter, e.g. a flying capacitor converter or a diode clamped converter.

The first voltage source converter 30 further includes a controller 60. The controller 60 is configured to receive an actual phase voltage $v_a, v_b, v_c$ and phase current $i_a, i_b, i_c$ of each phase of the three-phase AC electrical network 50, and is configured to generate a respective AC voltage demand $v_{conva}, v_{convb}, v_{convc}$ for each single-phase limb.

Figure 3:
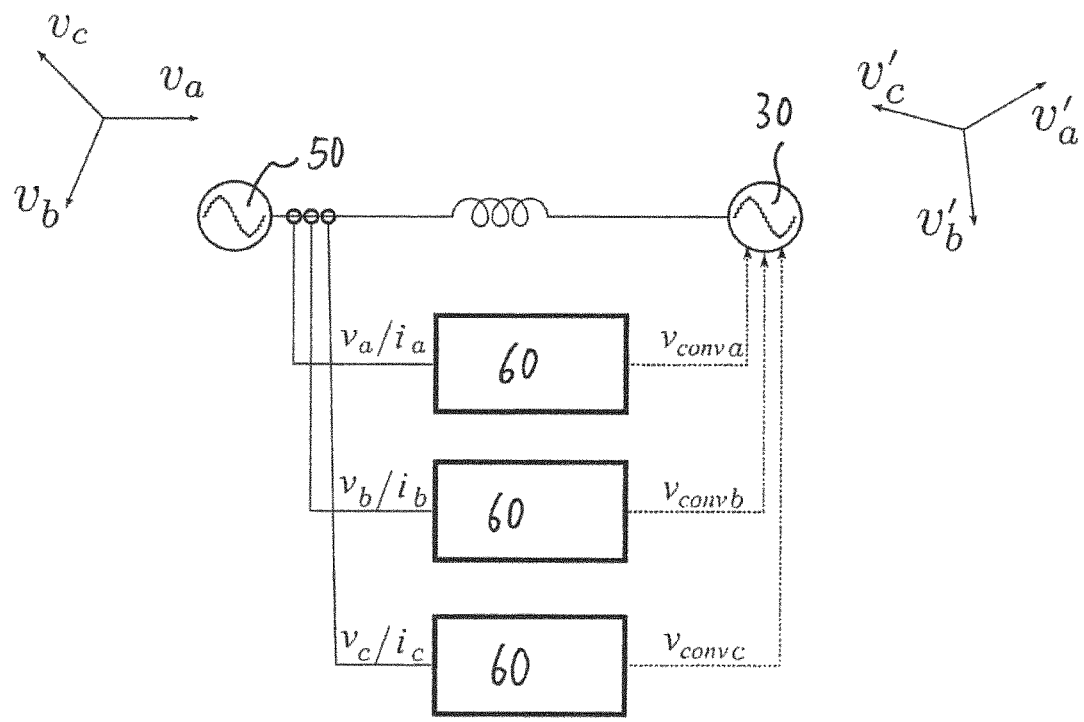
Figure 4:
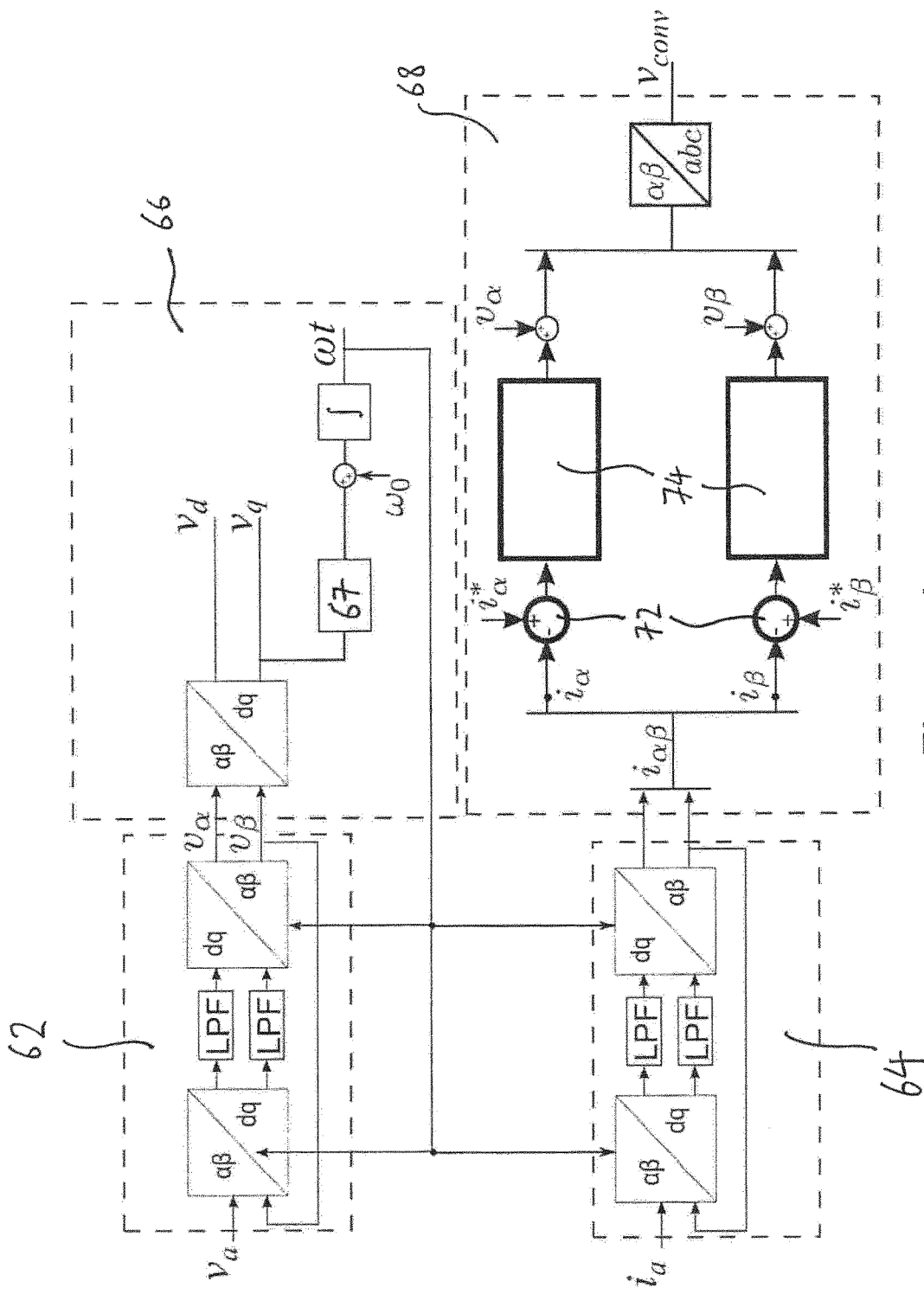

The controller 60 includes a plurality of sub-controllers, each of which is configured to control a respective one of the single-phase limbs, as shown in FIG. 3. Each sub-controller includes a quadrature signal generator (QSG) block, a reference frequency signal generation block 66 and a vector control block 68, as shown in FIG. 4

For the purposes of this specification, where appropriate, the structure of each sub-controller is described with reference to the sub-controller configured to control one of the single-phase limbs. It will be appreciated that the described structure of the sub-controller configured to control one of the single-phase limbs applies mutatis mutandis to each of the other sub-controllers configured to a respective one of the other single-phase limbs.

The QSG block of each sub-controller includes first and second QSG sub-blocks 62,64.

Each of the first and second QSG sub-blocks 62,64 includes an stationary α-β reference frame to a synchronously rotating d-q reference frame transformation block (i.e. an α-β to d-q transformation block), two low-pass filters and a synchronously rotating d-q reference frame to stationary α-β reference frame transformation block (i.e. a d-q to α-β transformation block).

The α-β to d-q transformation block of the first QSG sub-block 62 is configured to receive an actual phase voltage $v_a$ of a phase of the three-phase AC electrical network 50, and transform the received actual phase voltage $v_a$ into a voltage vector consisting of synchronously rotating direct and quadrature components. The voltage vector consisting of synchronously rotating direct and quadrature components is subsequently passed through the low-pass filters before transformed by the d-q to α-β transformation block into a voltage vector consisting of stationary direct and quadrature components $v_\alpha, v_\beta$. In this manner the actual phase voltage $v_a$ is processed by the first QSG sub-block 62 to generate a voltage vector consisting of stationary direct and quadrature components $v_\alpha, v_\beta$, the latter of which is an output signal that is orthogonal to the actual phase voltage $v_a$. The stationary quadrature component $v_\beta$ of the voltage vector is then fed back into the α-β to d-q transformation block.

The processing of the actual phase voltage $v_a$ of a phase of the three-phase AC electrical network 50 by the first QSG sub-block 62 therefore results in derivation of a voltage vector consisting of stationary direct and quadrature components $v_\alpha, v_\beta$ that is equivalent to a simulated three-phase AC power source 70a for the corresponding single-phase limb.

It is envisaged that, in other embodiments of the invention, the α-β to d-q transformation block of the first QSG sub-block may be configured to receive an actual phase current of a phase of the three-phase AC electrical network, and transform the received actual phase current into a current vector consisting of synchronously rotating direct and quadrature components, in order to enable derivation of a current vector consisting of stationary direct and quadrature components that is equivalent to a simulated three-phase AC power source for the corresponding single-phase limb.

Figure 5:
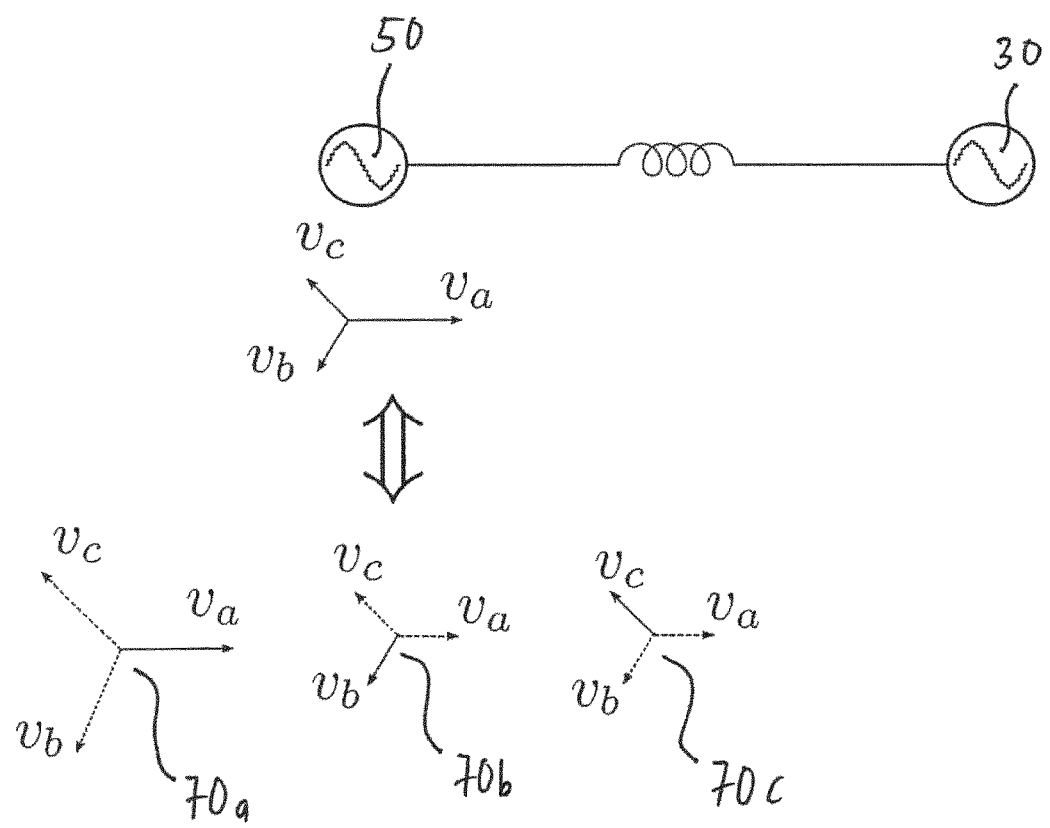

FIG. 5 illustrates, in schematic form, the respective simulated three-phase AC power source 70a,70b,70c for each single-phase limb. Each simulated three-phase AC power source 70a,70b,70c is defined by a plurality of balanced voltage phasors that consists of an actual voltage phasor (which is indicated by a solid voltage phasor in FIG. 5) and a plurality of virtual voltage phasors (each of which is indicated by a dashed voltage phasor in FIG. 5).

In this manner the QSG block of each sub-controller is configured to selectively process a respective actual phase voltage $v_a, v_b, v_c$ of the phases of the three-phase AC electrical network 50 so as to derive a respective simulated three-phase AC power source 70a,70b,70c for each single-phase limb.

Similarly the α-β to d-q transformation block of the second QSG sub-block 64 is configured to receive a corresponding phase current $i_a$, and transform the received phase current $i_a$ into a current vector consisting of synchronously rotating direct and quadrature components. The current vector consisting of synchronously rotating direct and quadrature components is then passed through the low-pass filters before transformed by the d-q to α-β transformation block into a current vector $i_{\alpha\beta}$ consisting of stationary direct and quadrature components $i_\alpha, i_\beta$. In this manner the phase current $i_a$ is processed by the second QSG sub-block 64 to generate a current vector $i_{\alpha\beta}$ consisting of stationary direct and quadrature components $i_\alpha, i_\beta$, the latter of which is an output signal that is orthogonal to the phase current $i_a$. The stationary quadrature component $i_\beta$ of the current vector $i_{\alpha\beta}$ is then fed back into the α-β to d-q transformation block.

The processing of the phase current $i_a$ in this manner results in derivation of a current vector $i_{\alpha\beta}$ that corresponds to the respective simulated three-phase AC power source 70a, whereby the current vector $i_{\alpha\beta}$ consists of stationary direct and quadrature components $i_\alpha, i_\beta$.

In this manner the second QSG sub-block 64 of each sub-controller is configured to selectively process the corresponding phase current $i_a, i_b, i_c$ so as to derive a respective current vector $i_{\alpha\beta}$ that corresponds to the respective simulated three-phase AC power source 70a,70b,70c.

The α-β to d-q transformation block of the reference frequency signal generation block 66 is configured to receive the voltage vector $v_{\alpha\beta}$ generated by the first QSG sub-block 62, and transform the received voltage vector into a voltage vector consisting of synchronously rotating direct and quadrature components $v_d, v_q$. The synchronously rotating quadrature component $v_q$ of the resultant voltage vector is then processed using a control function 67 and added to a frequency reference term ω0 to generate a compensation signal that is then driven to zero by way of integration so as to produce a reference frequency signal ωt that is fed back to the first and second QSG sub-blocks 62,64. The combination of the reference frequency signal generation block 66 and QSG sub-blocks 62,64 acts as a phased locked loop. It will be appreciated that the type of control function 67 used in the reference frequency signal generation block 66 may vary depending on the requirements of the associated power application.

The vector control block 68 includes a difference junction 72 and a proportional-resonant control block 74. The difference junction 72 compares each of the stationary direct and quadrature components $i_\alpha, i_\beta$ of the current vector $i_{\alpha\beta}$ generated by the second QSG sub-block 64 with a respective reference term $i_\alpha^*, i_\beta^*$ so as to generate a respective compensation signal. The compensation signals are then processed by the proportional-resonant control block 74 before being respectively added to stationary direct and quadrature components $v_\alpha, v_\beta$ of the actual phase voltage $v_a$ so as to generate a resultant voltage vector $v_{\alpha\beta}$ consisting of stationary direct and quadrature components $v_\alpha, v_\beta$. The resultant voltage vector $v_{\alpha\beta}$ consisting of stationary direct and quadrature components $v_\alpha, v_\beta$ is subsequently transformed by an stationary α-β reference frame to a three-phase stationary a-b-c reference frame transformation block (i.e. an α-β to a-b-c transformation block) so as to generate an AC voltage demand $v_{conv}$. Since the simulated AC power source 70a includes only one actual voltage phasor, the "a" voltage component of the generated AC voltage demand $v_{conv}$ is selected as a single-phase AC voltage demand $v_{conva}$ that is compatible for use with the corresponding single-phase limb.

In this manner the vector control block 68 of each sub-controller is configured to selectively process the respective current vector $i_{\alpha\beta}$ so as to generate a respective AC voltage demand $v_{conva}, v_{convb}, v_{convc}$ for the corresponding single-phase limb.

It will be appreciated that the reference terms $i_\alpha^*, i_\beta^*$ may be generated by a reference term generator block (not shown) that is configured to combine voltage magnitude and frequency terms with real and reactive power demands so as to derive the reference terms $i_\alpha^*, i_\beta^*$.

The controller 60 then selectively controls the switching elements 40,54 of the phase element 36 and auxiliary converter 38 of each single-phase limb in accordance with the respective AC voltage demand $v_{conva}, v_{convb}, v_{convc}$ to modify the AC voltage at the AC side 42 of its phase element 36. This in turn modifies the AC power demand for the respective phase and thereby results in a corresponding modification of each phase current $i_a, i_b, i_c$. This is because the AC power for each phase is proportional to its phase voltage $v_a, v_b, v_c$ and phase current $i_a, i_b, i_c$.

Operation of the first voltage source converter 30 of FIG. 1 is described as follows, with reference to FIGS. 6a to 6f.

In use, the controller 60 controls the switching elements 40,54 of the phase element 36 and auxiliary converter 38 of each single-phase limb to generate an AC voltage $v_a', v_b', v_c'$ at the AC side 42 of the corresponding phase element 36 so as to draw a respective phase current $i_a, i_b, i_c$ from the three-phase AC electrical network 50. Each AC voltage is set to correspond to a specific AC power demand so as to enable the first voltage source converter 30 to exchange a certain level of AC power with the three-phase AC electrical network 50. During normal operating conditions of the three-phase electrical network and the first voltage source converter 30, the plurality of phase currents $i_a, i_b, i_c$ drawn by the first voltage source converter 30 from the three-phase AC electrical network 50 are balanced.

However, during operation of the first voltage source converter 30, the plurality of phase currents $i_a, i_b, i_c$ drawn by the first voltage source converter 30 from the three-phase AC electrical network 50 may become unbalanced, thus causing the phase current $i_a, i_b, i_c$ drawn by each single-phase limb from the respective phase of the three-phase AC electrical network 50 to vary outside a respective normal operating range. This could be due to various factors such as uneven loading of the phases, uneven transmission line or transformer phase impedance, or manufacturing differences between the single-phase limbs.

Variation of the phase current $i_a, i_b, i_c$ drawn by each single-phase limb from the three-phase AC electrical network 50 outside a respective normal operating range results in energy accumulation in (or energy loss from) at least one energy storage device 56 of at least one of the auxiliary converters 38, thus resulting in deviation of the energy level of at least one energy storage device 56 from a reference value and resulting in an imbalance in the energy levels of the plurality of auxiliary converters 38.

Figure 6A:
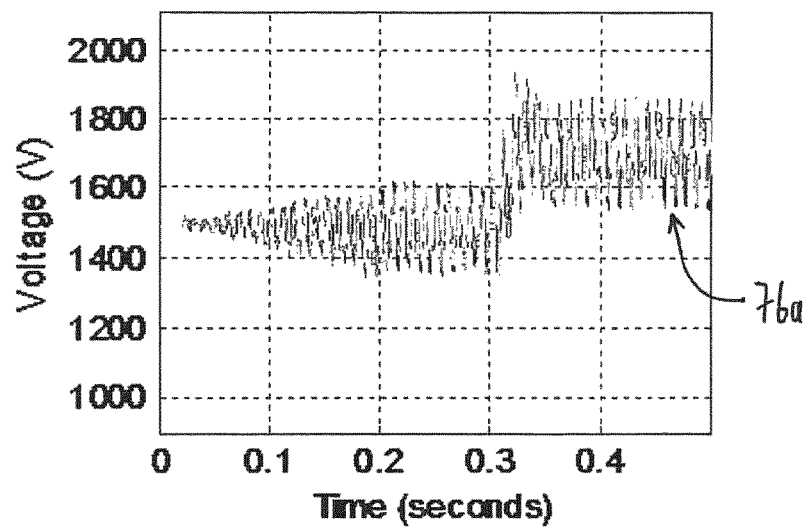
Figure 6B:
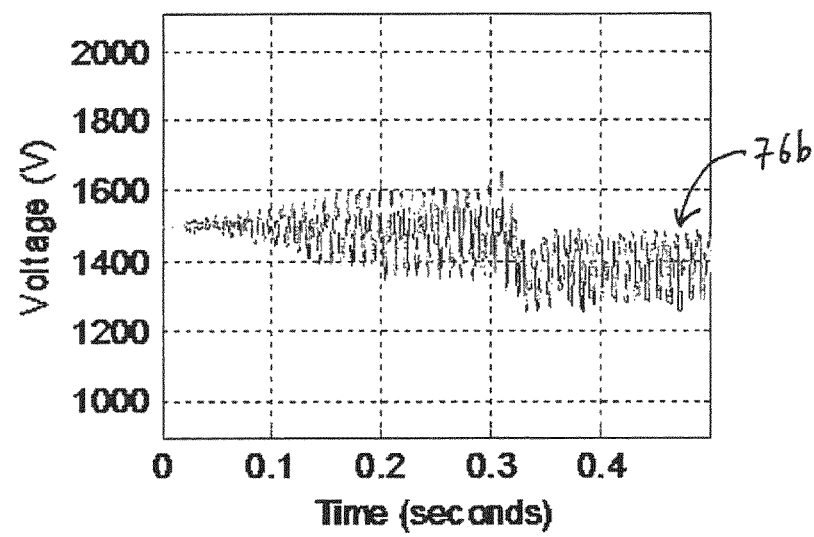
Figure 6C:
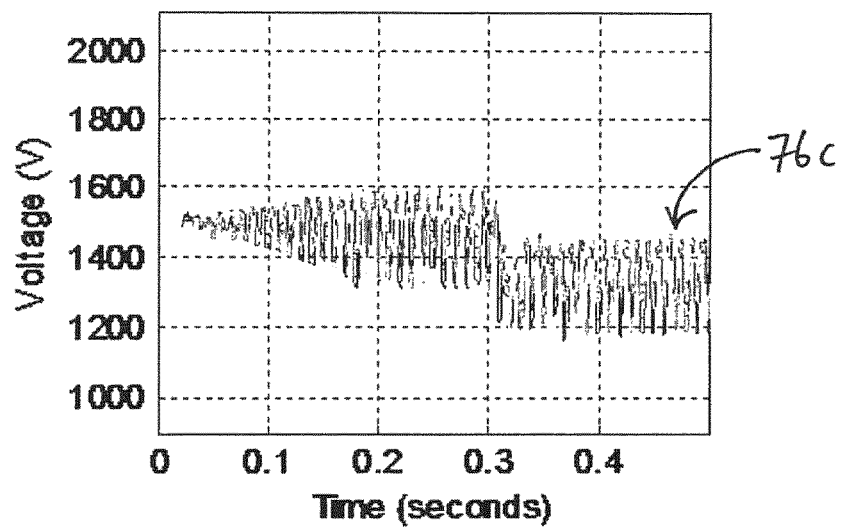

The imbalance in the energy levels of the plurality of auxiliary converters 38 is shown in FIGS. 6a to 6c which illustrate, in graph form, the variation in voltage level 76a,76b,76c of a capacitor in a respective auxiliary converter 38 of the first voltage source converter 30 when the plurality of phase currents $i_a, i_b, i_c$ drawn by the first voltage source converter 30 from the three-phase AC electrical network 50 are unbalanced.

Such deviation and imbalance is undesirable because, if too little energy is stored within a given energy storage device 56 then the voltage the corresponding module 52 is able to generate is reduced, whereas if too much energy is stored in a given energy storage device 56 then over-voltage problems may arise. The former would require the addition of a power source to restore the energy level of the affected energy storage device 56 to the reference value, while the latter would require an increase in voltage rating of one or more energy storage devices 56 to prevent the over-voltage problems, thus adding to the overall size, weight and cost of the first voltage source converter 30.

Therefore, to balance the energy levels of the plurality of auxiliary converters 38, the controller 60 processes the actual phase voltage $v_a,v_b,v_c$ and phase current $i_a,i_b,i_c$ of each phase of the three-phase AC electrical network 50 so as to generate a required modified AC voltage demand $v_{conva},v_{convb},v_{convc}$ for each single-phase limb in order to re-balance the plurality of phase currents $i_a,i_b,i_c$. More particularly, the stationary direct and quadrature components $i_\alpha,i_\beta$ of the current vector $i_{\alpha\beta}$ generated by the second QSG sub-block 64 of each sub-controller are compared with suitable reference terms so as to generate the required compensation signals and therefore the required modified AC voltage demand $v_{conva},v_{convb},v_{convc}$ for each phase element 36. The controller 60 then selectively controls the switching elements 40,54 of the phase element 36 and auxiliary converter 38 of each single-phase limb in accordance with the respective modified AC voltage demand $v_{conva},v_{convb},v_{convc}$ to modify the AC voltage $v_a',v_b',v_c'$ at the AC side 42 of its phase element 36 and thereby modify the corresponding phase current $i_a,i_b,i_c$ so as to balance the plurality of phase currents $i_a,i_b,i_c$. The re-balancing of the plurality of phase currents $i_a,i_b,i_c$ in turn permits balancing of the energy levels of the plurality of auxiliary converters 38.

Figure 6D:
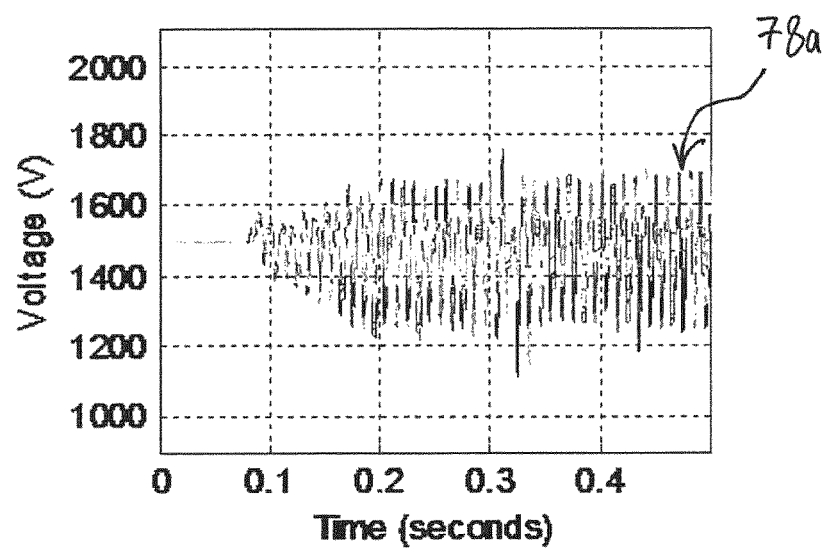
Figure 6E:
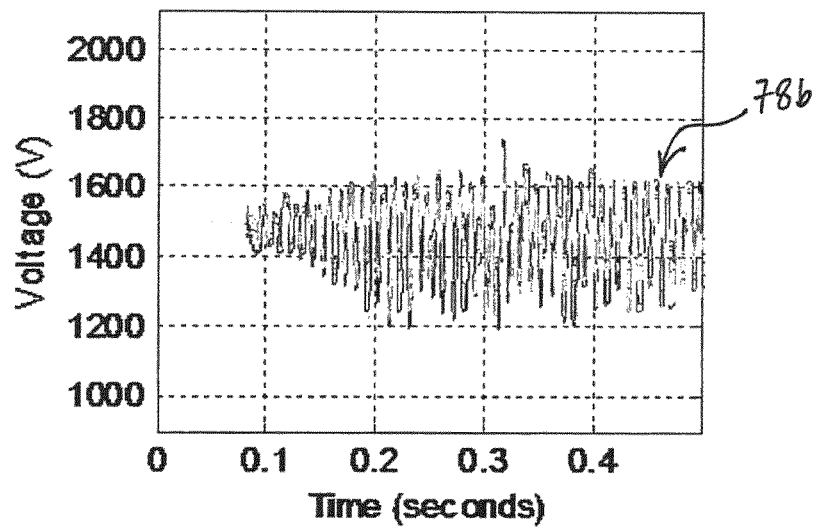
Figure 6F:
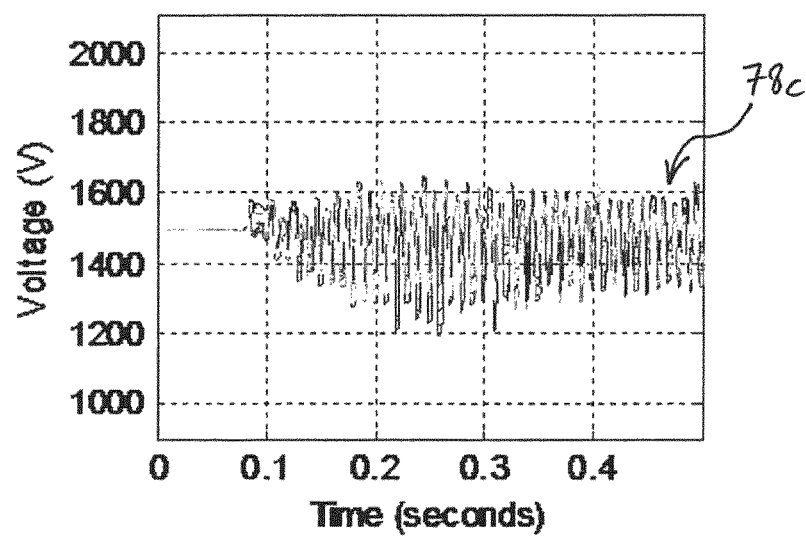

The balance in the energy levels of the plurality of auxiliary converters 38 is shown in FIGS. 6d to 6f which illustrate, in graph form, the variation in voltage level 78a,78b,78c of a capacitor in a respective auxiliary converter 38 of the first voltage source converter 30 when the plurality of phase currents $i_a,i_b,i_c$ drawn by the first voltage source converter 30 from the three-phase AC electrical network 50 are balanced.

In this manner the controller 60 is configured to selectively control each single-phase limb in accordance with the respective modified AC voltage demand to modify the AC voltage at the AC side 42 of its phase element 36 and thereby modify the corresponding phase current $i_a,i_b,i_c$ so as to carry out balancing of the energy levels of the plurality of auxiliary converters 38.

During operation of the first voltage source converter 30, damage to an auxiliary converter 38 could result in component failure in one or more modules 52 of the damaged auxiliary converter 38 leading to a reduction in energy storage capacity. This could also result in energy accumulation in (or energy loss from) at least one energy storage device 56 of the damaged auxiliary converter 38, especially when the phase currents are balanced, thus resulting in deviation of the energy level of at least one energy storage device 56 from a reference value and resulting in an imbalance in the energy levels of the plurality of auxiliary converters 38.

Therefore, to balance the energy levels of the auxiliary converters 38, the controller 60 processes the actual phase voltage $v_a,v_b,v_c$ and phase current $i_a,i_b,i_c$ of each phase of the three-phase AC electrical network 50 so as to generate a reduced AC voltage demand $v_{conva},v_{convb},v_{convc}$ for the single-phase limb with the damaged auxiliary converter 38 and an increased AC voltage demand $v_{conva},v_{convb},v_{convc}$ for each of the other single-phase limbs. The controller 60 then selectively controls the switching elements 40,54 of the phase element 36 and auxiliary converter 38 of each single-phase limb in accordance with the respective modified AC voltage demand $v_{conva},v_{convb},v_{convc}$ to modify the AC voltage at the AC side 42 of its phase element 36, and thereby reduce the phase current $i_a,i_b,i_c$ drawn by the single-phase limb with the damaged auxiliary converter 38 and increase the phase current $i_a,i_b,i_c$ drawn by each of the other single-phase limbs. This in turn permits balancing of the energy levels of the plurality of auxiliary converters 38.

The configuration of the first voltage source converter 30 therefore allows each single-phase limb to readily draw a suitable phase current $i_a,i_b,i_c$ from the three-phase AC electrical network 50 to regulate the energy stored in the energy storage devices 56 of the auxiliary converters 38, thereby obviating the problems associated with a deviation of the energy level of at least one energy storage device 56 from the reference value.

The configuration of the first voltage source converter 30 allows the control of each single-phase limb to draw a phase current $i_a,i_b,i_c$ from the three-phase AC electrical network 50 to be carried out independently of the control of each other single-phase limb to draw a phase current $i_a,i_b,i_c$ from the three-phase AC electrical network 50, and thereby enables modification of each phase current $i_a,i_b,i_c$ drawn from the three-phase AC electrical network 50 without affecting the other phase currents $i_a,i_b,i_c$. This provides the first voltage source converter 30 with the capability to readily draw a wide range of combinations of phase currents $i_a,i_b,i_c$ from the three-phase AC electrical network 50.

In contrast, omission of the controller 60 from the first voltage source converter 30 would make it difficult to modify one of the phase currents $i_a,i_b,i_c$ individually without affecting the other two remaining phase currents $i_a,i_b,i_c$ in response to an imbalance in the plurality of phase currents $i_a,i_b,i_c$ and/or a change in electrical rating of at least one single-phase limb, thus limiting the range of combinations of phase currents $i_a,i_b,i_c$ that can be readily drawn by the first voltage source converter 30 from the three-phase AC electrical network 50.

In addition the inclusion of the controller 60 in the first voltage source converter 30 obviates the need for additional converter hardware to provide the first voltage source converter 30 with a similar capability to readily draw a wide range of combinations of phase currents $i_a,i_b,i_c$ from the three-phase AC electrical network 50 in response to an imbalance in the plurality of phase currents $i_a,i_b,i_c$ and/or a change in electrical rating of at least one single-phase limb, thus minimising the size, weight and cost of the first voltage source converter 30.

There is provided a second voltage source converter according to a second embodiment of the invention. The second voltage source converter is similar in structure and operation to the first voltage source converter 30 of FIG. 1, and like features share the same reference numerals.

Figure 7:
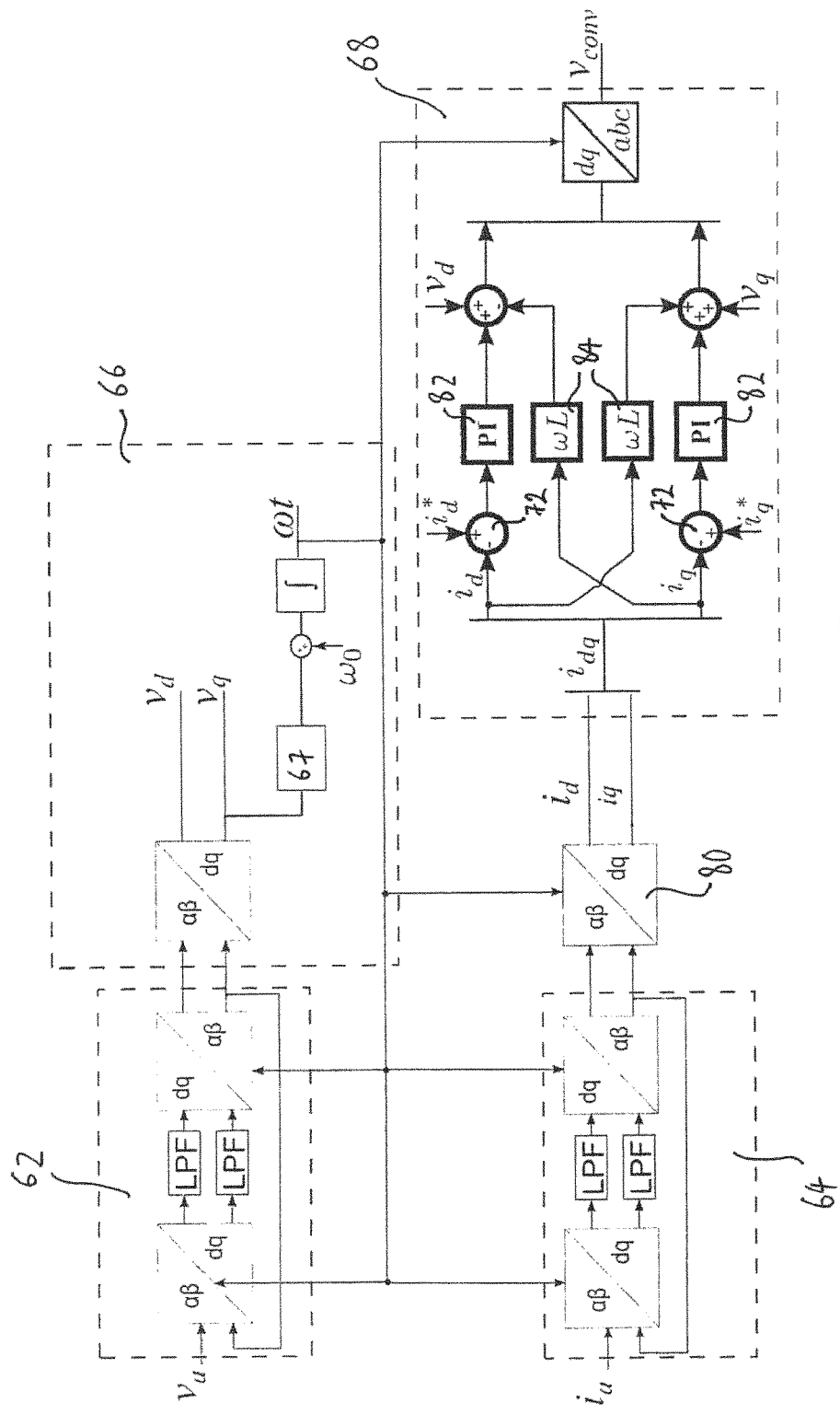
FIG. 7 shows, in schematic form, a controller of a voltage source converter according to a second embodiment of the invention.

The second voltage source converter differs from the first voltage source converter 30 in that, as shown in FIG. 7, in the controller 60 of the second voltage source converter:
  the QSG block of each sub-controller further includes an additional α-β to d-q transformation block 80;
  the vector control block 68 of the second voltage source converter includes a proportional-integral control block 82 instead of a proportional-resonant control block 74;

the vector control block 68 further includes an impedance control block 84.

The additional α-β to d-q transformation block 80 transforms the current vector generated by the second QSG sub-block 64 into a current vector $i_{dq}$ consisting of synchronously rotating direct and quadrature components $i_d, i_q$. The difference junction 72 of the vector control block 68 then compares each of the synchronously rotating direct and quadrature components $i_d, i_q$ of the current vector $i_{dq}$ with a respective reference term $i_d^*, i_q^*$ so as to generate a respective compensation signal. The compensation signals are then processed by the proportional-integral control block 82 before being combined with further reference terms that are obtained by using the impedance control block 84 to process each of the synchronously rotating direct and quadrature components $i_d, i_q$ and being respectively added to synchronously rotating direct and quadrature components $v_d, v_q$ of the actual phase voltage $v_a$, so as to generate a resultant voltage vector $v_{dq}$ consisting of synchronously rotating direct and quadrature components $v_d, v_q$.

The resultant voltage vector $v_{dq}$ consisting of synchronously rotating direct and quadrature components $v_d, v_q$ is subsequently transformed by a synchronously rotating d-q reference frame to a three-phase stationary a-b-c reference frame transformation block so as to generate an AC voltage demand $v_{conv}$. Since the simulated AC power source 70a includes only one actual voltage phasor, the "a" voltage component of the generated AC voltage demand $v_{conv}$ is selected as a single-phase AC voltage demand $v_{conva}$ that is compatible for use with the corresponding single-phase limb.

The reference frequency signal ωt produced by the reference frequency signal generation block 66 is also fed to the additional α-β to d-q transformation block 80 and the synchronously rotating d-q reference frame to a three-phase stationary a-b-c reference frame transformation block.

In this manner the vector control block 68 of each sub-controller is configured to selectively process the respective current vector $i_{dq}$ so as to generate a respective modified AC voltage demand $v_{conva}, v_{convb}, v_{convc}$ for the corresponding single-phase limb.

It will be appreciated that the reference terms $i_d^*, i_q^*$ may be generated by a reference term generator block (not shown) that is configured to combine voltage magnitude and frequency terms with real and reactive power demands so as to derive the reference terms $i_d^*, i_q^*$.

There is provided a third voltage source converter according to a third embodiment of the invention. The third voltage source converter is similar in structure and operation to the first voltage source converter 30 of FIG. 1, and like features share the same reference numerals.

Figure 8:
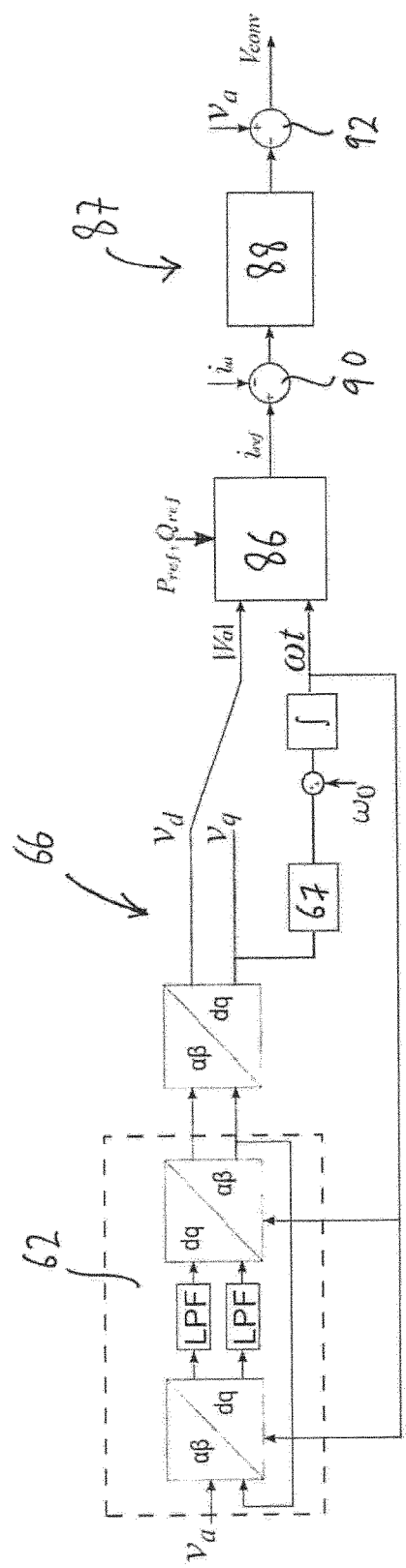
FIG. 8 shows, in schematic form, a controller of a voltage source converter according to a third embodiment of the invention.

The third voltage source converter differs from the first voltage source converter 30 in that, in the controller 60 of the third voltage source converter, each sub-controller omits the second QSG sub-block 64 and vector control block 68, as shown in FIG. 8.

The controller 60 of the third voltage source converter further includes a reference current demand generator block 86 and a control block 87. The control block 87 includes a proportional-resonant control block 88 and first and second difference junctions 90, 92.

The reference current demand generator block 86 is configured to receive the voltage vector stationary direct component $v_d$ and reference frequency signal ωt from the reference frequency signal generation block 66. The voltage vector stationary direct component $v_d$ and reference frequency signal ωt respectively define voltage magnitude and frequency terms $|V_a|$, ωt. The reference current demand generator block 86 is further configured to combine the voltage magnitude and frequency terms $|V_a|$, ωt with real and reactive power demands $P_{ref}, Q_{ref}$ so as to derive a reference current demand $i_{ref}$.

A first difference junction 90 then compares the reference current demand ire with the corresponding actual phase current $i_a$ to generate a current compensation signal. The current compensation signal is then processed by the proportional-resonant control block 88 before being compared by a second difference junction 92 with the corresponding actual phase voltage $v_a$ to generate an AC voltage demand $v_{conv}$, which defines the AC voltage demand $v_{conva}$ for the corresponding single-phase limb.

In this manner the control block 87 of each sub-controller is configured to selectively process the respective reference current demand $i_{ref}$ and the corresponding phase current $i_a$ so as to generate a respective modified AC voltage demand $v_{conva}, v_{convb}, v_{convc}$ for the corresponding single-phase limb.

The generation of the respective modified AC voltage demand $v_{conva}, v_{convb}, v_{convc}$ for the corresponding single-phase limb enables operation of each single-phase limb to cause the actual phase current $i_a$ to track the reference current demand $i_{ref}$.

There is provided a fourth voltage source converter according to a fourth embodiment of the invention. The fourth voltage source converter is similar in structure and operation to the third voltage source converter, and like features share the same reference numerals.

Figure 9:
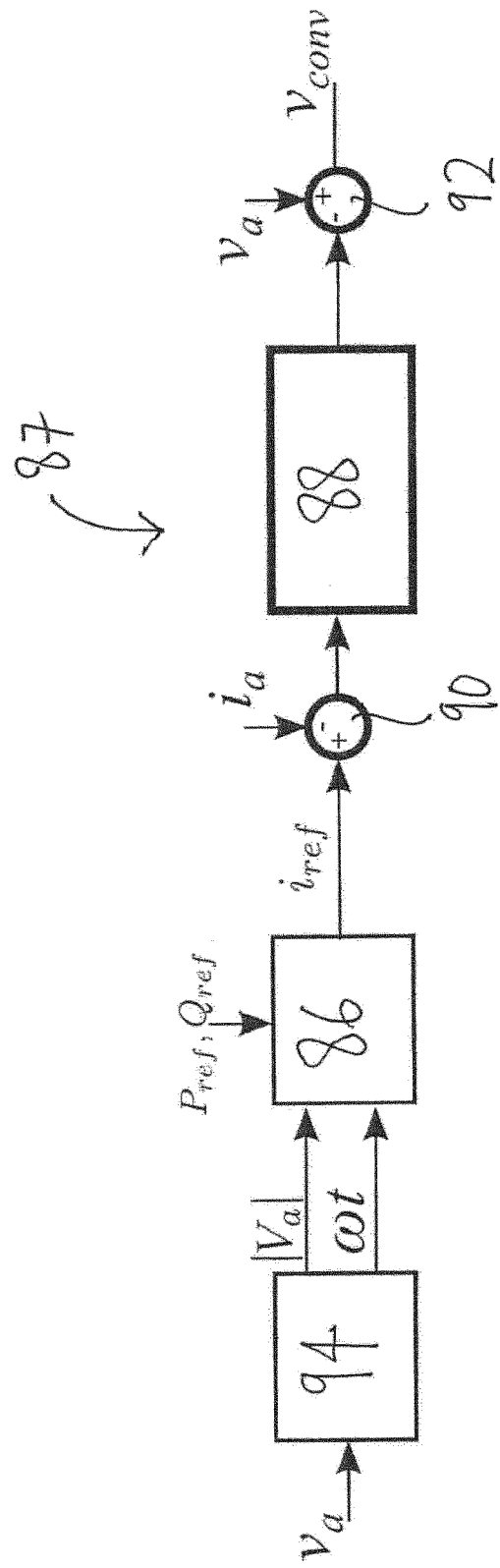
FIG. 9 shows, in schematic form, a controller of a voltage source converter according to a fourth embodiment of the invention.

The fourth voltage source converter differs from the third voltage source converter in that, in the controller 60 of the fourth voltage source converter, the first QSG sub-block 62 is replaced by a single-phase phased locked loop (PLL) 94, as shown in FIG. 9.

The single-phase PLL 94 is configured to process an actual phase voltage va of a respective phase of the multi-phase AC electrical network 50 so as to derive voltage magnitude and frequency terms $|V_a|$, ωt for subsequent input into the reference current demand generator block 86.

The configuration of the single-phase PLL 94 may vary as long as it is capable of selectively processing an actual phase voltage $v_a$ of a respective phase of the multi-phase AC electrical network 50 so as to derive the voltage magnitude and frequency terms $|V_a|$, ωt.

Figure 10:
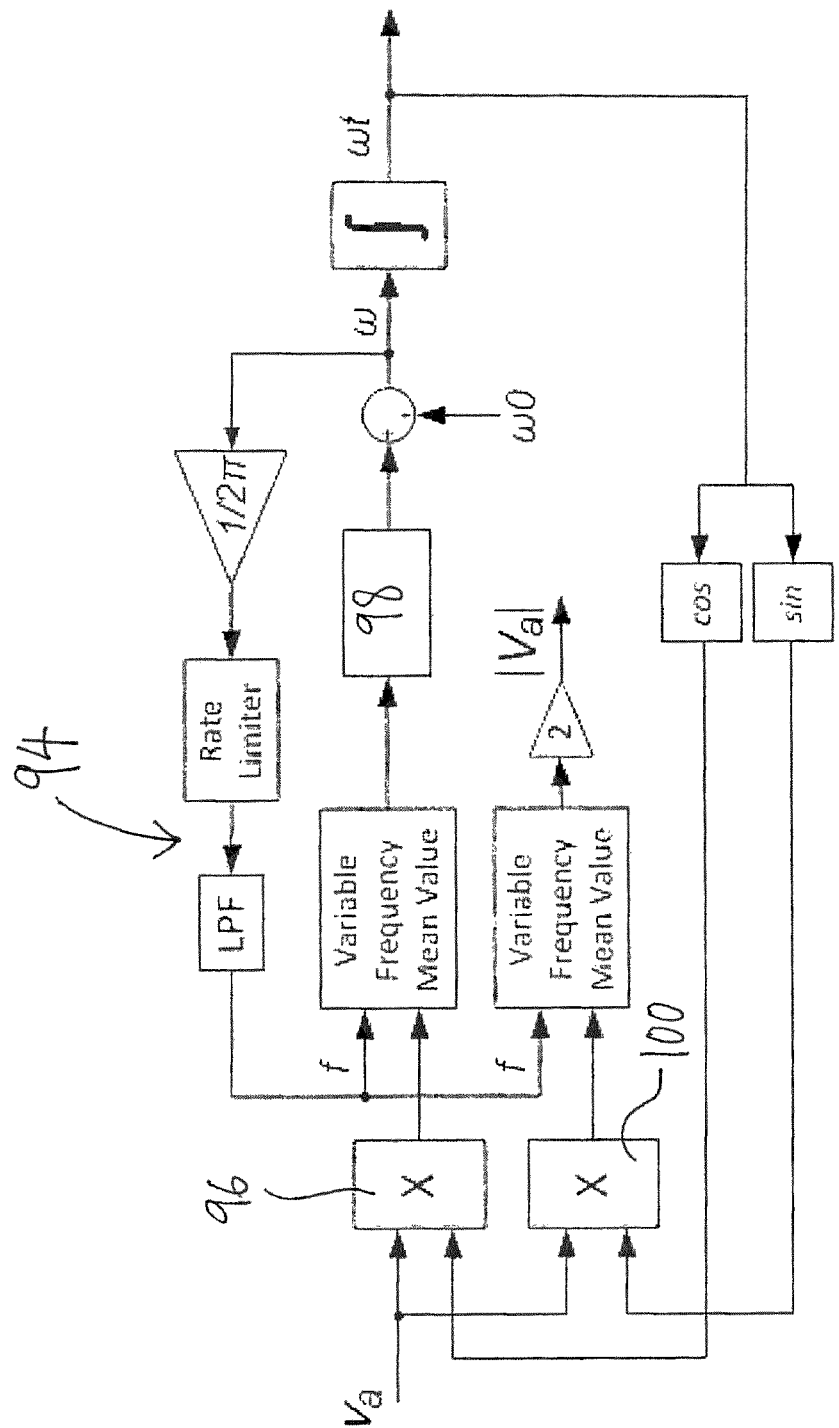
FIG. 10 shows an exemplary arrangement of a single-phase phased locked loop.

FIG. 10 shows an exemplary arrangement of the single-phase PLL 94.

The single-phase PLL 94 is configured to receive an actual phase voltage $v_a$ of a phase of the three-phase AC electrical network 50.

The actual phase voltage $v_a$ is multiplied 96 by a cosine value of a reference frequency signal ωt that is fed back from the output of the single-phase PLL 94. The output of the multiplication 96 of the actual phase voltage $v_a$ and the cosine value contains a mean value component and an oscillatory component, whereby the mean value component simulates a quadrature component $v_q$. The oscillatory component is filtered using a first variable frequency mean value block. The output of the first variable frequency mean value block is therefore the mean value component (i.e. the quadrature component $v_q$ of the resultant voltage vector) which is then processed using a control function block 98 and added to a frequency reference term ω0 to generate a compensation signal ω. The compensation signal ω is then integrated to produce the reference frequency signal ωt that is fed back to the cosine and sine blocks, each of which respectively provides cosine and sine values of the reference frequency signal wt.

The magnitude $|V_a|$ of the actual phase voltage $v_a$ is calculated by multiplying 100 the actual phase voltage $v_a$ by a sine value of the reference frequency signal ωt that is fed back from the output of the single-phase PLL 94. The output of the multiplication 100 of the actual phase voltage $v_a$ and the sine value also contains a mean value component and an oscillatory component, whereby the mean value component simulates a direct component $v_d/2$. The oscillatory component is filtered using a second variable frequency mean value block. The output of the second variable frequency mean value block is therefore the mean value component (i.e. the direct component $v_d/2$) which is then multiplied by a gain of 2 to give the voltage magnitude term $|V_a|$ of the actual phase voltage $v_a$.

The compensation signal ω, which is the combination of the control function block 98 and the frequency reference term ω0, is fed back to each variable frequency mean value block after being multiplied by a gain of ½π and being passed through a rate limiter block and a low-pass filter to generate a reference frequency f. The reference frequency f is used by each variable frequency mean value block to filter out the oscillatory components.

It will be appreciated that the configuration of the single-phase PLL 94 shown in FIG. 10 is merely chosen to help illustrate the operation of the invention, and that the single-phase PLL 94 shown in FIG. 10 may be replaced by another type of single-phase PLL with a different configuration.

The single-phase PLL 94 according to another exemplary arrangement (not shown) includes a zero crossing detector, a time counter, and a peak magnitude detector. The zero crossing detector and the time counter are configured to work in combination to measure the frequency of the actual phase voltage $v_a$ so as to enable derivation of the frequency term ωt, and the peak magnitude detector is configured to measure the peak magnitude of the actual phase voltage $v_a$ so as to enable derivation of the voltage magnitude term $|V_a|$.

It will be appreciated that the configuration of each of the first and second voltage source converters 30 permits operation of the controller 60 to enable modification of only one of the plurality of phase currents $i_a, i_b, i_c$, or simultaneous modification of only two of the plurality of phase currents $i_a, i_b, i_c$.

In the embodiments shown, the AC side 42 of each phase element 36 is connected to a respective phase of a three-phase AC electrical network 50. It is envisaged that, in other embodiments, the number of single-phase limbs in the voltage source converter may vary with the number of phases of a multi-phase AC electrical network, and the AC side of each phase element may be connected to a respective phase of the multi-phase phase AC electrical network.

It will also be appreciated that the configuration of the controller may vary so as long as the controller is capable of selectively generating a or a respective modified AC voltage demand for at least one single-phase limb in response to an imbalance in the phase currents and/or a change in electrical rating of at least one single-phase limb, and the controller is capable of selectively controlling, in accordance with the or the respective modified AC voltage demand, the or each corresponding single-phase limb independently of the or each other single-phase limb to modify the AC voltage at the AC side of its phase element and thereby modify the corresponding phase current.

The invention claimed is:

1. A voltage source converter comprising:
   first and second DC terminals for connection to a DC electrical network;
   a plurality of single-phase limbs, each single-phase limb including a phase element, each phase element including a plurality of switching elements configured to interconnect a DC voltage and an AC voltage, an AC side of each phase element being connectable to a respective phase of a multi-phase AC electrical network, each single-phase limb being connected between the first and second DC terminals, each single-phase limb being controllable to generate an AC voltage at the AC side of the corresponding phase element so as to draw a respective phase current from the multi-phase AC electrical network; and
   a controller configured to selectively generate a or a respective modified AC voltage demand for at least one single-phase limb in response to an imbalance in the plurality of phase currents and/or a change in electrical rating of at least one single-phase limb,
   wherein each single-phase limb includes an auxiliary converter connected with the respective phase element, each auxiliary converter configured to selectively act as a waveform synthesizer to modify a DC voltage at a DC side of the corresponding phase element, each auxiliary converter including a current source or multilevel converter, each auxiliary converter including at least one module, the or each module including at least one switching element and at least one energy storage device, the or each switching element and the or each energy storage device in each module combining to selectively provide a voltage source; and
   wherein the controller is configured to selectively control, in accordance with the or the respective modified AC voltage demand, the or each corresponding single-phase limb independently of the or each other single-phase limb to modify the AC voltage at the AC side of its phase element and thereby modify the corresponding phase current so as to carry out regulation of the energy level of the or each corresponding auxiliary converter.

2. A voltage source converter according to claim 1 wherein the controller is configured to selectively control, in accordance with the or the respective modified AC voltage demand, the or each corresponding single-phase limb independently of the or each other single-phase limb to modify the AC voltage at the AC side of its phase element and thereby modify the corresponding phase current so as to balance the plurality of phase currents.

3. A voltage source converter according to claim 1 wherein the controller is configured to selectively process an or a respective actual phase voltage or phase current of at least one phase of the multi-phase AC electrical network so as to derive a or a respective simulated multi-phase AC power source for the or each corresponding single-phase limb, the or each simulated multi-phase AC power source being defined by a plurality of balanced voltage or current phasors that consists of an actual voltage or current phasor and a plurality of virtual voltage or current phasors, the controller being further configured to selectively process the or each corresponding phase current and the or each plurality of balanced voltage or current phasors so as to generate a or a respective modified AC voltage demand for the or each corresponding single-phase limb in response to an imbalance in the plurality of phase currents and/or a change in electrical rating of at least one single-phase limb.

4. A voltage source converter according to claim 3 wherein the controller is further configured to selectively process the or each plurality of balanced voltage phasors to derive voltage magnitude and frequency terms, the controller being configured to combine the voltage magnitude and frequency terms with real and reactive power demands so as to derive a or a respective reference current demand, the controller being configured to process the or each reference current demand and the or each corresponding phase current so as to generate a or a respective modified AC voltage demand for the or each corresponding single-phase limb in response to an imbalance in the plurality of phase currents and/or a change in electrical rating of at least one single-phase limb.

5. A voltage source converter according to claim 4 wherein the controller includes at least one quadrature signal generator block configured to selectively process an or a respective actual phase voltage of at least one phase of the multi-phase AC electrical network so as to derive a or a respective simulated multi-phase AC power source for the or each corresponding single-phase limb, the or each simulated multi-phase AC power source being defined by a plurality of balanced voltage phasors that consists of an actual voltage phasor and a plurality of virtual voltage phasors, the or each quadrature signal generator block being further configured to selectively process the or each plurality of balanced voltage phasors to derive the voltage magnitude and frequency terms.

6. A voltage source converter according to claim 5 wherein the or each quadrature signal generator block is configured to selectively process an or a respective actual phase voltage or phase current of at least one phase of the multiphase AC electrical network to generate a respective output signal, the or each output signal being orthogonal to the corresponding actual phase voltage or phase current, so as to derive the or the respective simulated multi-phase AC power source for the or each corresponding singlephase limb.

7. A voltage source converter according to claim 4 wherein the controller further includes at least one control block configured to selectively process the or each reference current demand and the or each corresponding phase current so as to generate a or a respective modified AC voltage demand for the or each corresponding single-phase limb in response to an imbalance in the plurality of phase currents and/or a change in electrical rating of at least one single-phase limb, the or each control block including a proportional-resonant control block.

8. A voltage source converter according to claim 3 wherein the controller is configured to selectively process an or a respective actual phase voltage or phase current of at least one phase of the multi-phase AC electrical network so as to derive a or a respective simulated multi-phase AC power source for the or each corresponding single-phase limb, the or each simulated multi-phase AC power source being defined by a plurality of balanced voltage or current phasors that consists of an actual voltage or current phasor and a plurality of virtual voltage or current phasors, the controller being further configured to selectively process the or each corresponding phase current so as to derive a or a respective current vector that corresponds to the or the respective simulated multi-phase AC power source, the controller being further configured to selectively process the or each current vector so as to generate a or a respective modified AC voltage demand for the or each corresponding single-phase limb in response to an imbalance in the plurality of phase currents and/or a change in electrical rating of at least one single-phase limb.

9. A voltage source converter according to claim 8 wherein the controller includes at least one quadrature signal generator block configured to selectively process an or a respective actual phase voltage or phase current of at least one phase of the multi-phase AC electrical network so as to derive a or a respective simulated multi-phase AC power source for the or each corresponding single-phase limb, the or each simulated multi-phase AC power source being defined by a plurality of balanced voltage phasors that consists of an actual voltage or current phasor and a plurality of virtual voltage or current phasors, the or each quadrature signal generator block being further configured to selectively process the or each corresponding phase current so as to derive a or a respective current vector that corresponds to the or the respective simulated multi-phase AC power source, the controller further including at least one vector control block configured to selectively process the or each current vector so as to generate a or a respective modified AC voltage demand for the or each corresponding single-phase limb in response to an imbalance in the plurality of phase currents and/or a change in electrical rating of at least one single-phase limb.

10. A voltage source converter according to claim 9 wherein the or each vector control block includes a proportional-integral control block or a proportional-resonant control block.

11. A voltage source converter according to claim 8 wherein the or each current vector is in a synchronously rotating d-q reference frame or stationary α-β reference frame.

12. A voltage source converter according to claim 1 wherein the controller is configured to selectively process an or a respective actual phase voltage of at least one phase of the multi-phase AC electrical network so as to derive voltage magnitude and frequency terms, the controller being configured to combine the voltage magnitude and frequency terms with real and reactive power demands so as to derive a or a respective reference current demand, the controller being configured to process the or each reference current demand and the or each corresponding phase current so as to generate a or a respective modified AC voltage demand for the or each corresponding single-phase limb in response to an imbalance in the plurality of phase currents and/or a change in electrical rating of at least one single-phase limb.

13. A voltage source converter according to claim 12 wherein the controller includes at least one single-phase phase locked loop configured to selectively process an or a respective actual phase voltage of at least one phase of the multi-phase AC electrical network so as to derive the voltage magnitude and frequency terms.

14. A voltage source converter according to claim 1 wherein the plurality of switching elements in each phase element includes two parallel connected pairs of series-connected switching elements, a junction between each pair of series connected switching elements defining an AC terminal for connection to the respective phase of the multi-phase AC electrical network.

15. A voltage source converter according to claim 1 wherein the plurality of single-phase limbs is connected in series between the first and second DC terminals.

16. A voltage source converter according to claim 1 wherein each auxiliary converter is connected in parallel with the corresponding phase element to form the respective single-phase limb.

17. A voltage source converter according to claim 1 wherein regulation of the energy level of the or each corresponding auxiliary converter involves balancing of the energy levels of the plurality of auxiliary converters.

* * * * *